(12) United States Patent
Parkvall

(10) Patent No.: US 8,023,990 B2
(45) Date of Patent: Sep. 20, 2011

(54) UPLINK SCHEDULING IN A CELLULAR SYSTEM

(75) Inventor: Stefan Parkvall, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 366 days.

(21) Appl. No.: 12/406,282

(22) Filed: Mar. 18, 2009

(65) Prior Publication Data

US 2009/0239590 A1 Sep. 24, 2009

Related U.S. Application Data

(60) Provisional application No. 61/037,807, filed on Mar. 19, 2008.

(51) Int. Cl.
*H04B 7/005* (2006.01)
*H04B 1/38* (2006.01)
*H04B 7/26* (2006.01)
*H04W 52/22* (2009.01)

(52) U.S. Cl. .......... 455/522; 455/69; 455/572; 370/311; 370/318

(58) Field of Classification Search .................. 455/522, 455/572, 69; 370/311, 318
See application file for complete search history.

(56) References Cited

U.S. PATENT DOCUMENTS

| 2003/0207696 A1 | 11/2003 | Willenegger et al. |
| 2008/0045260 A1 | 2/2008 | Muharemovic et al. |
| 2010/0285830 A1* | 11/2010 | Englund et al. ............... 455/522 |

FOREIGN PATENT DOCUMENTS

EP 1868301 A2 12/2007

OTHER PUBLICATIONS

3rd Generation Partnership Project; Technical Specification Group Radio Access Network; Evolved Universal Terrestrial Radio Access (E-UTRA); Physical layer procedures (Release 8); 3GPP TS 36.213 v8.2.0 (Mar. 2008), 30 pages.

* cited by examiner

*Primary Examiner* — Daniel D Chang

(57) ABSTRACT

A method for use in a wireless cellular access system, according to which users in a cell in the system receive one or more transmission power control commands on a control channel, where the transmission power control commands comprise an identifier for the intended user or users, said identifier being either an identifier for a specific user or for a group of users. A user disregards one or more predefined control commands if the identifier of the control command is for a group of users in which said user is included.

12 Claims, 4 Drawing Sheets

UPLINK SCHEDULING IN A CELLULAR SYSTEM

This patent application claims priority from U.S. Provisional Application No. 61/037,807 filed 19 Mar. 2008, which is incorporated by reference herein.

BACKGROUND

The present invention discloses a method and a device for use in a wireless cellular access system in which users in a cell in the system receive transmission power control commands on a control channel.

In some cellular access systems, such as, for example, the Long Term Evolution (LTE) system, data in both uplink and downlink (i.e., from and to users, respectively) is transmitted on channels which are shared in both frequency and time between multiple users. Examples of shared so called physical channels in the LTE system are the Physical Downlink Shared Channel (PDSCH) and the Physical Uplink Shared Channel (PUSCH).

Due to the principle of shared channels, control signaling is necessary, at least in the downlink, i.e., to the users in the cells of an LTE system. One of the downlink control channels in the LTE system is the PDCCH channel, the Physical Downlink Control Channel. The PDCCH is used to carry Downlink Control Information, DCI, such as, for example, scheduling decisions, transmission power control commands, and other specific control signaling. In more detail, the downlink control information possible to send on the PDCCH includes:

Downlink scheduling assignments, including resource indications for the PDSCH transport format, hybrid-ARQ information, transport block size, MIMO-related control information if applicable, and Physical Uplink Control Channel (PUCCH) transmission power control commands.

Uplink scheduling grants, including resource indications for the PUSCH, the Physical Uplink Shared Channel, transport format, hybrid-ARQ related information, and PUSCH transmission power control commands.

Transmission power control commands of groups of user terminals as a complement to the transmission power control commands which are "piggy-backed" with the scheduling decisions.

The PDCCH can use various formats for the DCI. However, regardless of the DCI format, the PDCCH will comprise a so called RNTI, Radio-Network Temporary Identifier, which is an identity for the user terminal for which the PDCCH and the associated DCI is intended. In order to enable the use of RNTI, each user terminal in a cell is assigned its own RNTI, the so called C-RNTI, which may be used when making downlink transmissions to that user terminal.

In each so called subframe, a user terminal monitors the PDCCHs in the cell. Upon detecting its own identity, the C-RNTI, in one of the PDCCHs, the user terminal declares the PDCCH contents valid, and follows the contents of the PDCCH. In the case of the PDCCH contents being downlink scheduling, the user terminal attempts to decode the associated data transmission on PDSCH resources pointed out by the PDCCH. The result of the decoding attempts, e.g., positive acknowledgement, ACK, or negative acknowledgement, NACK, is transmitted in uplink by the user terminal.

Based upon the ACK or NACK, a decision can be made on whether or not to transmit new data, i.e., when the ACK is received, or to retransmit the previous data, i.e., when the NACK is received, indicating that the user terminal's reception was in error. The ACK/NACK is usually transmitted on an uplink control channel known as the PUCCH, Physical Uplink Control Channel. As the reception of ACK/NACK is important for correct operation of the system, it is crucial to adjust the transmission output power of the PUCCH so that the received power is sufficiently high to correctly receive the ACK/NACK, but not so high that unnecessary interference is created in the system.

In order to control the PUCCH output power of user terminals in a cell, the PDCCH comprises two bits which signify the allowed transmission power of the PUCCH for a user terminal. The terminal uses the information given in these two bits to increase or decrease the PUCCH transmission power. In this way, the network can ensure that a proper level of transmission power is used by a terminal for the PUCCH.

The C-RNTI is, as mentioned above, the unique user terminal identity of the terminal for downlink addressing purposes. However, in addition to having a C-RNTI for the purposes of downlink "unicast" data, each terminal can also be allocated one or several so called "group RNTIs". A group RNTI is an identity which is common to a plurality of terminals in a cell, and is consequently used to transmit downlink information which is relevant to more than one terminal.

One example of such information is system parameters which are necessary for all the terminals in a cell in order to be able to access the system. Obviously this type of information should be transmitted using an RNTI known by all terminals in the cell. Another example of "multicast" information is paging, which uses the paging channel, the PCH, in which so called paging groups are defined, with each paging group having a common group paging RNTI assigned. A third example of downlink multicast information is the so called random access response, which uses a random access RNTI. In this case as well, multiple terminals can be addressed by a group RNTI.

Thus, as explained above, a user terminal is required to simultaneously be able to receive unicast data, addressed by the terminal-specific C-RNTI, as well as common data such as system information, addressed by a different and common (non-terminal-specific) RNTI. When several terminals are addressed simultaneously, as a group, they should not transmit any ACK/NACK on the PUCCH, since the network may not be able to tell from which terminal each of the ACK/NACKs originated. For this reason, in the LTE system, the current specification states that no ACK/NACK response should be sent in such a situation. Since no ACK/NACK is transmitted, there is no need for the terminals to adjust the PUCCH transmission power in such a situation.

SUMMARY

The current LTE specifications state that a terminal shall always update its transmission power upon reception of a PDCCH command. Thus, according to the current solution, when multiple terminals are addressed using a group RNTI, all of the terminals in the group have needed to update their PUCCH transmission power according to the power control command in the PDCCH, which has resulted in undesirable and inaccurate PUCCH power control results in the terminals in the group.

It is therefore an object of the present invention to obviate or reduce the disadvantages of downlink group transmissions, in particular with respect to the adjustment of uplink transmission power, and to provide an improved method and a terminal for a wireless cellular access system. The present invention obtains this object by disclosing a method for use in a wireless cellular access system, according to which users in a cell in the system receive transmission power control commands on a control channel.

According to the method, the transmission power control commands received by the users comprise an identifier for the intended user or users; the identifier is either an identifier for a specific user or for a group of users, and according to the method of the invention, a user disregards a transmission power control command if the identifier which is comprised in the transmission power control command is for a group of users in which that user is included. Thus, since according to the invention, a user will disregard a transmission power control command if the transmission power control command is addressed by means of its identifier to more than one user, the disadvantages mentioned above can be reduced or indeed entirely eliminated.

In one embodiment of the present invention, the transmission power control commands also comprise format information, and the user will also disregard a transmission power control command if the format information in the transmission power control command is not one of a predefined group of at least one format.

The invention also discloses a transceiver for use as a user terminal in a system in which the invention is applied.

DETAILED DESCRIPTION

The following describes the invention using terminology from an LTE system. However, it should be pointed out that this is in order to facilitate the reader's understanding of the invention, and is not intended to limit the scope of protection sought for the present invention.

Figure 1:
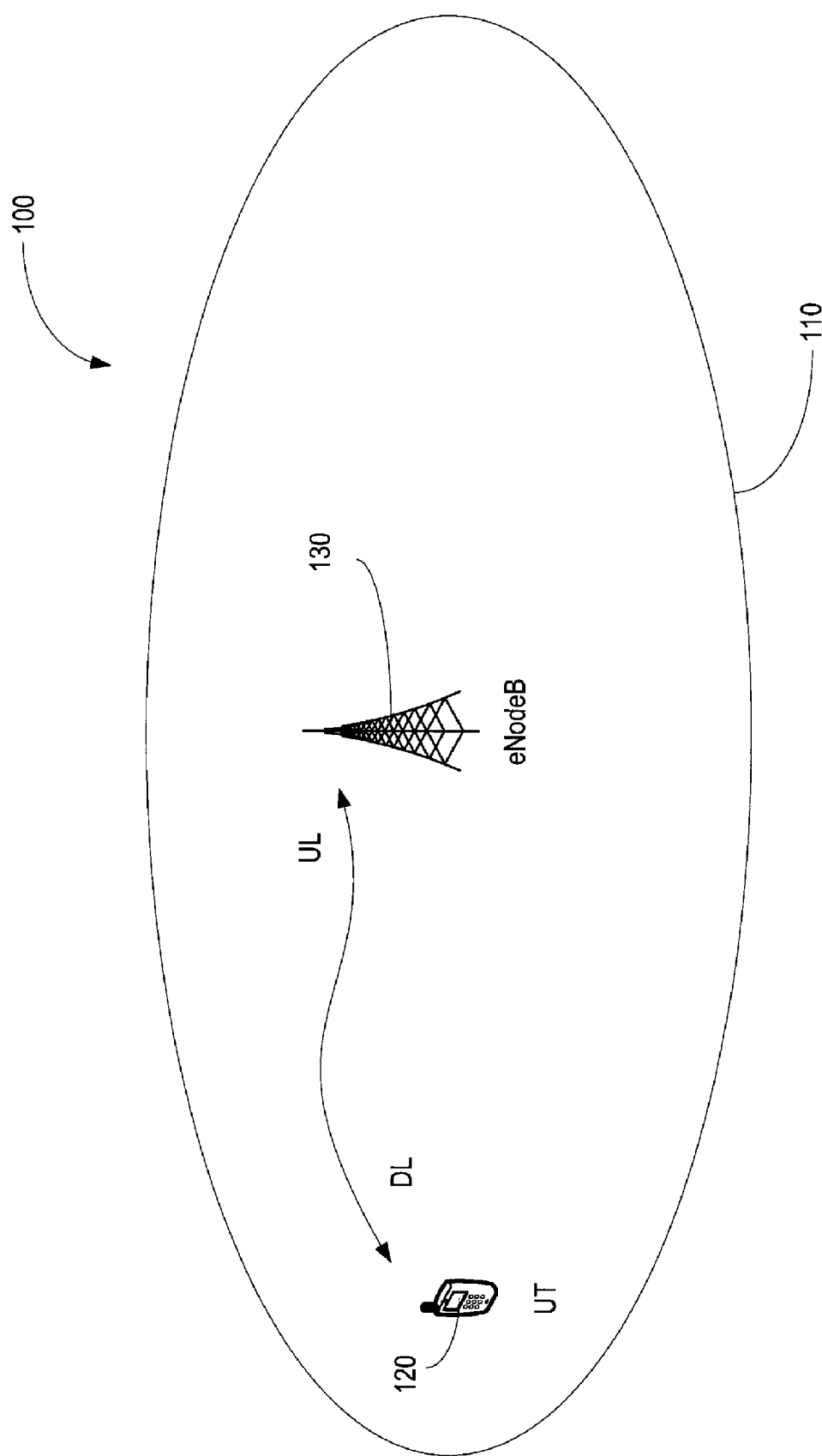
FIG. 1 shows a schematic overview of a system in which the invention may be applied.

FIG. 1 shows a schematic view of a system 100 in which the invention can be applied. System 100 includes a number of cells 110, each of which is arranged to accommodate a number of user terminals 120. The cell 110 is associated with a base station 130, which is referred to in the LTE standards as an eNodeB. Base station 130 controls traffic to and from the user terminals 120 in the cell 110, and coordinates the behavior of the user terminals 120 by sending control commands to the user terminals 120 in the cell 100 over one or more downlink control channels. Transmissions from the user terminals 120 to the base station 130 are known as uplink (UL) transmissions, and transmissions from the base station 130 to the user terminals 120 are known as downlink (DL) transmissions.

The Downlink Shared Channel (DL-SCH) in the LTE standard is a time and code multiplexed channel shared by a plurality of user terminals 120. During each 1 ms scheduling interval, referred to in the standard as Transmission Time Interval (TTI), base station 130 schedules one or more user terminals 120 to receive data on the DL-SCH. The user terminals 120 scheduled to receive data in a given TTI are chosen based on Channel Quality Indication (CQI) reports from the user terminals 120. The CQI reports indicate the instantaneous channel conditions as seen by the receiver at the user terminals 120. The base station 130 also uses the CQI reports from the user terminals 120 to select the transmission format for the downlink transmissions. The transmission format includes, for example, the transport block size, modulation, and coding, which are selected to achieve a desired error performance.

The identity of the user terminals 120 scheduled to receive data in a given time interval, and the transmission format, are transmitted to the user terminals 120 in a downlink scheduling message over a shared downlink control channel, referred to in the LTE standards as the Physical Downlink Control Channel (PDCCH). The PDCCH is a control channel used to transmit Downlink Control Information (DCI), such as downlink, transport formats, HARQ information, transport block size, and Transmission Power Control Commands (TPCC) for the Physical Uplink Control Channel (PUCCH). Several DCI formats are defined for downlink scheduling messages. Each user terminal 120 is assigned a 16-bit Radio Network Temporary Identifier (RNTI) or Cell Radio Network Temporary Identifier (C-RNTI) that is used to identify the user terminal 120. When base station 130 schedules a user terminal 120, it inserts the RNTI of the scheduled user terminal 120 into the downlink scheduling message transmitted on the PDCCH to notify the user terminal 120 that it has been scheduled to receive data on the DL-SCH.

When user terminal 120 receives a scheduling message containing it own RNTI, the user terminal 120 decodes the associated data transmission on the Physical Downlink Shared Channel (PDSCH) using the transport format indicated in the downlink scheduling message, and sends an acknowledgement (ACK/NACK) message to the base station 130 to indicate whether the data was successfully decoded. The acknowledgement message could be either a positive acknowledgement (ACK) to indicate successful decoding or a negative acknowledgement (NACK) message to indicate a decoding failure.

Based on the acknowledgement message received from the user terminal 120, base station 130 determines whether to transmit new data (ACK received) or to retransmit the previous data (NACK received). Those skilled in the art will appreciate that the retransmission may include additional bits (incremental redundancy) not contained in the original transmission.

The acknowledgement message is transmitted from the user terminal 120 to the base station 130 on an uplink control channel referred to as the Physical Uplink Control Channel (PUCCH). Because reception of the acknowledgement message is important for correct operation of HSDPA, it is crucial to adjust the transmission power of the user terminal 120 on the PUCCH such that the base station 130 correctly receives the acknowledgement message without creating unnecessary interference. To control the transmission power of the user terminal 120 on the PUCCH, the base station 130 may insert a Transmission Power Control Command (TPCC) into the downlink scheduling message. The TPCC is a two-bit command that instructs the user terminal 120 to either increase or decrease the transmission power on the PUCCH.

The PUCCH power control can be operated in an accumulative mode. In an accumulative mode, the new transmission power on the PUCCH is set to the current value of the PUCCH transmission power increased or decreased by a specified amount as indicated by the TPCC in the downlink scheduling message. Thus, the power control commands are accumulative in the sense that the new PUCCH transmission power depends on the full history of the TPCCs receipt by the user terminal 120.

Those skilled in the art will appreciate that the PUCCH is used for other uplink control signaling in addition to sending acknowledgement messages from the user terminal 120 to the base station 130. Specifically, the user terminal 120 may send scheduling requests and channel quality estimates to the base station 130 on the PUCCH. Accurate control of the received power on the PUCCH is therefore important to ensure that these control signals are correctly received.

As noted above, each user terminal 120 is assigned an RNTI. The RNTI is used to address the user terminal 120 when transmitting unicast data to the user terminal 120 as described above. Additionally, one or more group RNTIs may be allocated to the user terminals 120. A group RNTI addresses downlink control messages to a group of user terminals 120. A group RNTI is common to all user terminals 120 in a group, which may comprise all of the user terminals 120 in a cell. Examples of messages that may be addressed to groups of user terminals 120 include system parameter messages, paging messages, and random access response messages. A system parameters message is a message that conveys information necessary for all of the user terminals 120 to access the system.

When several user terminals 120 are addressed simultaneously in a message transmitted on the PDCCH, the user terminals 120 should not transmit an acknowledgement message on the PUCCH. Because no acknowledgement message is transmitted, there is also no need to adjust the PUCCH transmission power. However, the current LTE specifications state that the user terminals 120 shall always update the transmission power upon reception of a control message on the PDCCH. In the case of a control message addressed to multiple user terminals 120, each of the user terminals 120 receives the same TPCC. Consequently, the TPCC in a control message with a group RNTI may not properly control the transmission power of all of the user terminals 120 in the group, leading to undesirable and inaccurate power control results.

Figure 2:
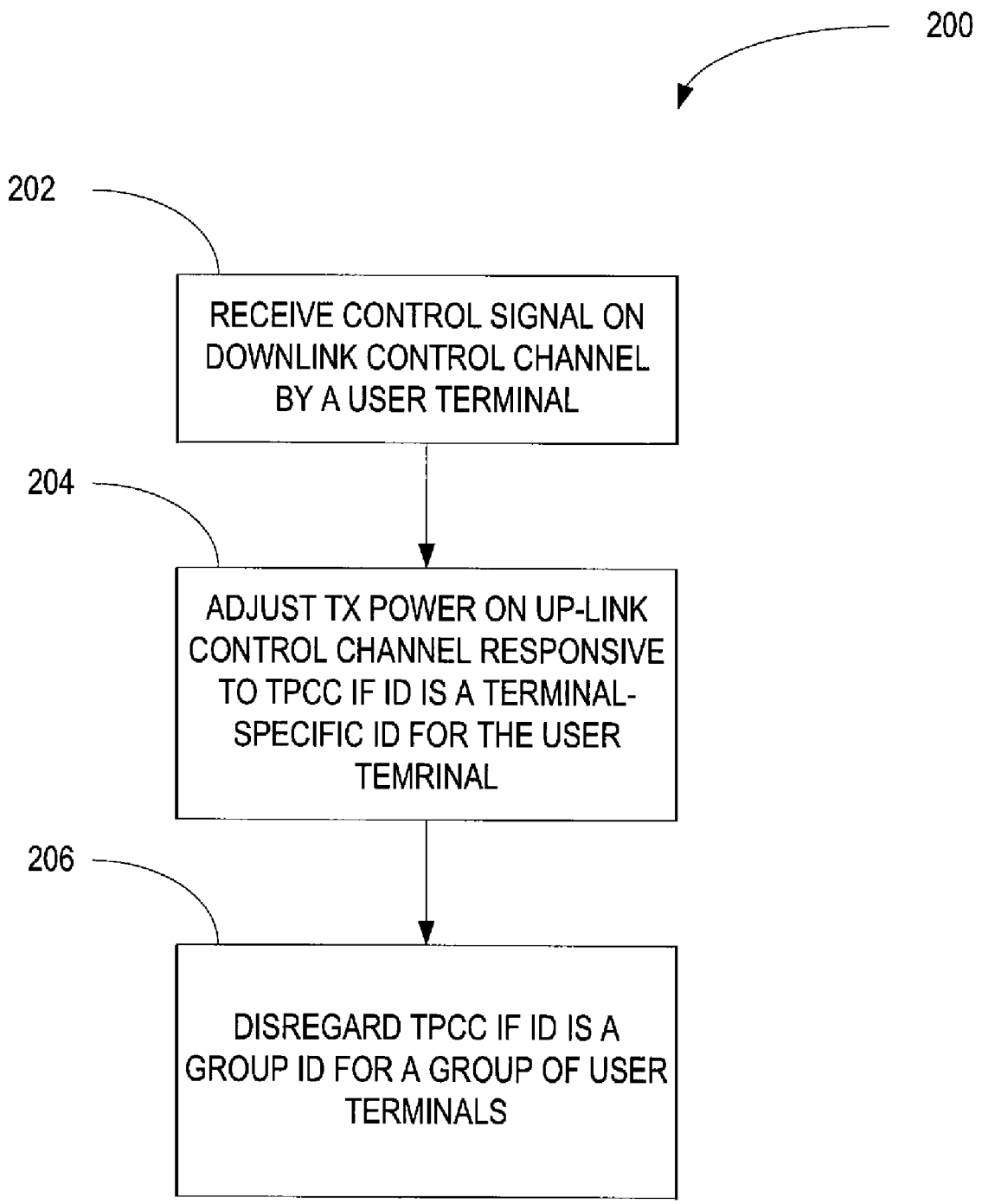
FIGS. 2 and 3 show a schematic flow chart of a method of the invention.

FIG. 2 illustrates an exemplary method 200 for controlling the transmission power of the user terminal 120 on an uplink control channel that provides more accurate power control results. The user terminal 120 receives a downlink signaling message on the downlink control channel (block 202). The control signal may include either a terminal specific RNTI or a group RNTI. If the downlink signaling message includes a terminal specific RNTI for the receiving user terminal 120, the receiving user terminal 120 adjusts its transmit power on the uplink control channel responsive to the TPCC in the downlink signaling message (block 204). On the other hand, if the downlink signaling message includes a group RNTI for a group of user terminals 120 that includes the receiving user terminal 120, the receiving user terminal 120 disregards the TPCC (block 206). Thus, the TPCC is ignored by the user terminal 120 when the control message is addressed to a group of user terminals 120.

In one embodiment, the downlink signaling messages may further comprise format information. Certain formats may be designated for use with group RNTIs and certain formats may be designated to use with terminal-specific RNTIs. The user terminal 120 may also disregard a transmission power control command if the format information in the transmission power control command is not one of a predefined group of at least one format. This will be elaborated on further in connection with an explanation of how the invention is applied in an LTE system. In other words, the user terminal 120 can use the DCI format in order to decide to disregard a TPCC in the case where a particular format is designated for use with a group RNTI.

Figure 3:
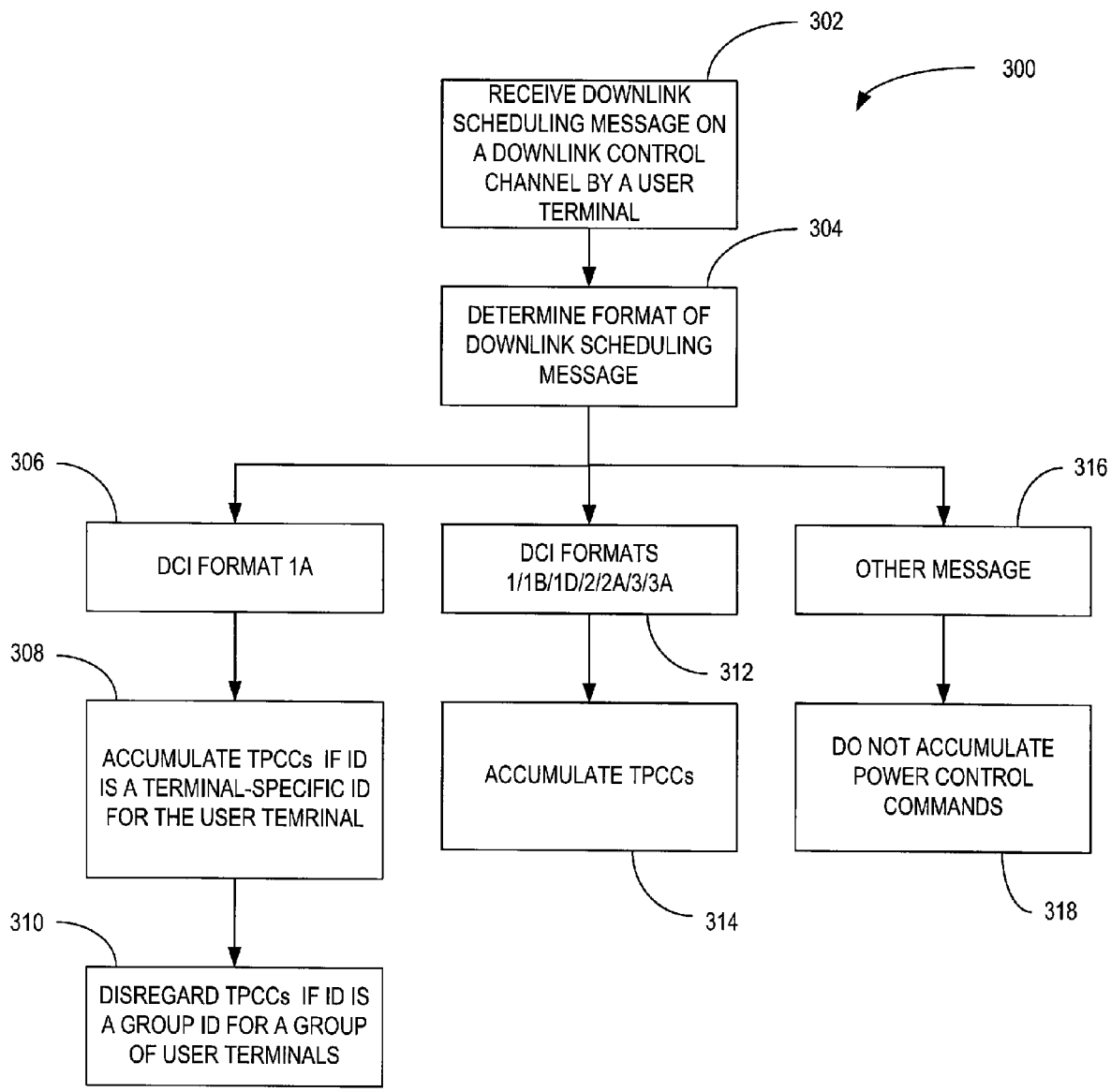

FIG. 3 illustrates an exemplary method 300 according to one embodiment of the present invention for use with an LTE communication system. The LTE standard defines several DCI formats for downlink scheduling messages. The defined formats includes DCI formats 1, 1A, 1B, 1D, 2, 2A, 3, and 3A. In scheduling messages formatted according to DCI format 1A, the RNTI can be either a terminal-specific RNTI or a group RNTI. The user terminal 120 should not adjust the transmit power on the PUCCH when the RNTI is a group RNTI.

The user terminal 120 monitors the PDCCH and decodes received scheduling messages during each subframe except when in DRX mode. The method 300 begins when the user terminal 120 receives a downlink scheduling message from the base station 130 (block 302). When a downlink scheduling message is received, the user terminal 120 determines the format of the downlink scheduling message (block 304). If the format is DCI format 1A (block 306), the user terminal 120 determines whether the RNTI is a terminal-specific RNTI for the user terminal 120, or a group RNTI for a group that includes the user terminal 120. If the RNTI is a terminal-specific RNTI for the user terminal, the user terminal 120 adjusts the transmission power on the PUCCH according to the TPCC contained in the downlink scheduling message (block 308). If the RNTI is a group RNTI, the user terminal 120 ignores the TPCC in the downlink scheduling message (block 310). If the format of the downlink scheduling message is one of DCI formats 1, 1B, 1D, 2, 2A, 3, and 3A (block 312), the user terminal 120 accumulates the TPCC contained in the downlink scheduling message (block 314). If any other message is received (block 316), no adjustment is made to the transmission power (block 318). When scheduling messages with format 1A and format 3/3/A are received in the same subframe, the TPCC in the scheduling message with the DCI format 1 overrides the TPCC in the message with DCI format 3/3A.

Another way of expressing the method in "pseudo code" is as follows:

if the user terminal 120 decodes a PDCCH with DCI format 1A and the detected RNTI equals the C-RNTI of the user terminal 120, the user terminal 120 shall accumulate the TPCC provided in that PDCCH, else if the user terminal 120 decodes a PDCCH with DCI format other than 1A, the user terminal 120 shall accumulate the TPCC provided in that PDCCH.

else the user terminal 120 shall set $\delta_{PUCCH}=0$ dB.

The computation of the transmission power on the PUCCH is defined in the LTE standard and is not material to the present invention. To briefly summarize, the setting of the transmission power may be defined by:

$$P_{PUCCH}(i) = \min\{P_{MAX}, P_{O\_PUCCH} + PL + h(n_{CQI}, n_{HARQ}) + \Delta_{F\_PUCCH}(F) + g(i)\} [dbm],$$

where the terms are defined as follows:

$P_{MAX}$ represents the maximum transmit power of the user terminal 120;

$P_{O\_PUCCH}$ represents a parameter defined by the LTE standard composed of the sum of a 5-bit cell specific parameter $P_{O\_NORMAL\_PUCCH}$ provided by higher layer signaling in the range of [−127,−96] dBm with 1 dB resolution and a user terminal specific component $P_{O\_UE\_PUCCH}$ configured by Radio Resource Control (RRC) in the range [−8,7] dB with a 1 dB resolution;

PL represents the path loss;

h(n) represents a PUCCH format dependent value defined by the LTE standard, where $n_{CQI}$ corresponds to the number of channel quality information bits and $n_{HARQ}$ represents the number of HARQ information bits;

$\Delta_{F\_PUCCH}(F)$ represents a value defined by the LTE standard that corresponds to the PUCCH format F and provided by higher layer signaling; and g(i) represents the current PUCCH power control adjustment state.

The current PUCCH power control adjustment state g(i) is given by:

$$g(i)=g(i-1)+\delta_{PUCCH}(i-K_{PUCCH}),$$

where $\delta_{PUCCH}(i)$ represents the adjustment signaling by the TPCC for the $i^{th}$ power adjustment period and $K_{PUCCH}$ represents an offset corresponding to the lag between the time that the TPCC is sent and the time that it is considered in the computation of the transmission power on the PUCCH.

For a current adjustment interval i, the user terminal 120 determines the TPCC sent at $i-K_{PUCCH}$. The user terminal 120 adds the power adjustment indicated by the TPCC sent at $i-K_{PUCCH}$ to the previous transmission power setting g (i−1) to obtain the new transmission power setting g(i). If the user terminal 120 has reached maximum power, positive TPCCs are not accumulated. If the user terminal 120 has reached minimum power, negative TPCCs are not accumulated. For DCI format 1A, the TPCC is not accumulated if the downlink power control command is addressed using a group RNTI. The user terminal 120 can reset the accumulation at cell change, when entering or leaving RRC active state, when $P_{O\_PUCCH}$ is received, when the user terminal 120 resynchronizes, and when the user terminal receives a random access response message.

Figure 4:
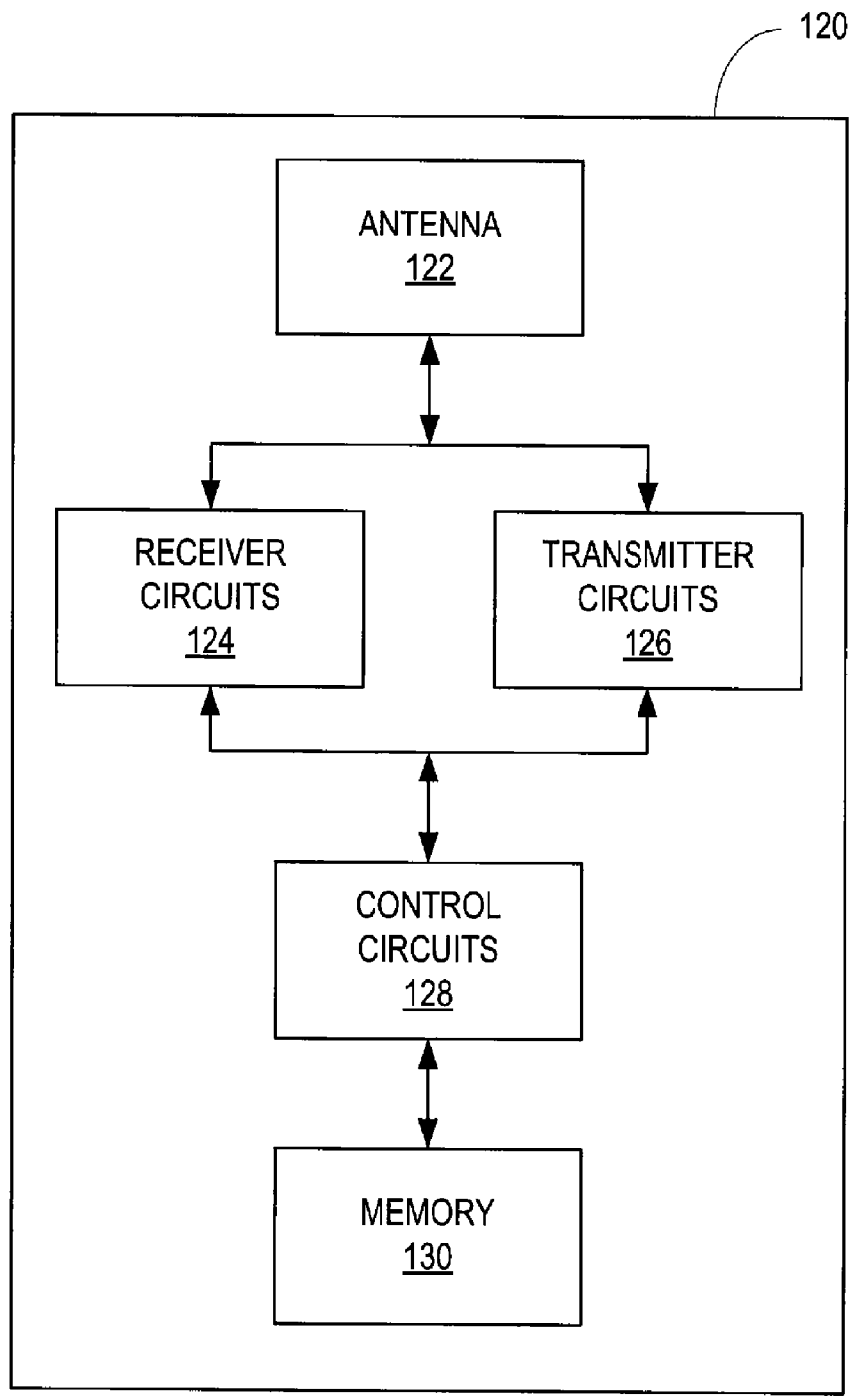
FIG. 4 shows a block diagram of a transceiver of the invention.

FIG. 4 shows a schematic block diagram of an exemplary user terminal 120. As indicated in FIG. 4, the user terminal 120 will comprise an antenna 122, receiver circuits 124, and transmitter circuits 126. In addition, the user terminal 120 also comprises control circuits 128 including one or more processors, microcontrollers, hardware or a combination thereof, and memory 130. The user terminal 120 is intended for use in a wireless cellular access system 100. As described above, the user terminal 120 receives downlink scheduling messages on a downlink control channel (e.g., the PDCCH) via the receiver circuits 122. The control circuits 128 detect the user terminal identifier (e.g., RNTI) and the power control commands in the downlink scheduling message, and control the transmitter circuits 124 in response to the TPCC to adjust the transmission power on an uplink control channel (e.g., the PUCCH). The identifier may be either an identifier for a specific user terminal 120 or for a group of user terminals. The control circuits 128 disregard the transmission power control command if the identifier of the transmission power control command is for a group of user terminals in which the user terminal 120 itself is included.

In one embodiment, the control circuits 128 may also detect format information in the downlink scheduling commands, and disregard a transmission power control command for specified formats.

In one embodiment, the user terminal 120 is a user terminal for an LTE system, Long Term Evolution. In such an embodiment, the control channel is the LTE PDCCH, Physical Downlink Control Channel, and the identifier can be the RNTI Radio Network Temporary Identifier or the C-RNTI, Cell Radio Network Temporary Identifier. Also, in one "LTE" embodiment of the user terminal 120, the identifier is the DCI format, so that one DCI format is used to address individual users, and another is used to address multiple users. In such a case, the format information can be the LTE DCI, Downlink Control Information.

The invention is not limited to the examples of embodiments described above and shown in the drawings, but may be freely varied within the scope of the appended claims.

What is claimed is:

1. A method implemented by a user terminal in a mobile communication system for controlling the transmit power of a user terminal, said method comprising:
   receiving by said user terminal a transmission power control command on a downlink control channel, the transmission power control command being associated with an identifier that identifies either a specific user terminal or a group of user terminals;
   adjusting the transmit power of the user terminal on an uplink control channel responsive to the transmission power control command if the identifier is a terminal-specific identifier for the user terminal; and
   disregarding the transmission power control command if the identifier is for a group of user terminals.

2. The method of claim 1, wherein disregarding the transmission power control command if the identifier in said downlink scheduling message is for a group of users, comprises:
   determining a format associated with said transmission power control command; and
   disregarding said transmission power control command if said downlink scheduling message is in a format that uses a group identifier.

3. The method of claim 1, wherein the user terminal is configured to operate according to the Long Term Evolution (LTE) standard.

4. The method of claim 3, wherein the control channel is the LTE Physical Downlink Control Channel (PDCCH).

5. The method of claim 4, wherein the identifier is a Radio Network Temporary Identifier (RNTI) or a Cell Radio Network Temporary Identifier (C-RNTI).

6. The method of claim 5 wherein the format of the downlink scheduling message comprises one of a group of Downlink Control Information (DCI) formats.

7. A user terminal for use in a wireless cellular access system, said user terminal comprising:
   a transceiver for receiving a first downlink scheduling message on a downlink control channel and for transmitting a second downlink scheduling message on an uplink control channel, said first downlink scheduling message comprising an identifier that identifies a specific user terminal or a group of user terminals to receive data transmitted on a shared traffic channel and a transmission power control command for controlling the transmit power of the user terminal on the uplink control channel; and
   a control processor configured to adjust its transmit power on the uplink control channel responsive to the transmission power control command in the downlink scheduling message when the identifier in said downlink scheduling message is a terminal-specific identifier for the user terminal, and to disregard the transmission power control command if the identifier is for a group of user terminals.

8. The user terminal of claim 7, wherein the control processor is configured to disregard the transmission power control command if the identifier in said downlink scheduling message is for a group of user terminals by:
   determining a format of said downlink scheduling message; and disregarding said transmission power control command if said downlink scheduling message is in a format that uses a group identifier.

9. The user terminal of claim 7, wherein the user terminal is configured to operate according to the Long Term Evolution (LTE) standard.

10. The user terminal of claim 9, wherein the control channel is the LTE Physical Downlink Control Channel (PDCCH).

11. The user terminal of claim 10, wherein the identifier is a Radio Network Temporary Identifier (RNTI) or a Cell Radio Network Temporary Identifier (C-RNTI).

12. The user terminal of claim 9, wherein the format of the downlink scheduling message comprises one of a group of Downlink Control Information (DCI) formats.

* * * * *